Patented Nov. 18, 1952

2,618,613

UNITED STATES PATENT OFFICE 2,618,613

TREATMENT OF HYDROCARBON CONVERSION CATALYSTS

Charles N. Kimberlin, Jr., and Julius P. Bilisoly, Baton Rouge, La., assignors to Standard Oil Development Company, a corporation of Delaware No Drawing. Application October 27, 1948, Serial No. 56,914

1 Claim. (Cl. 252—412)

This invention relates to processes for the conversion of hydrocarbons and more particularly, to processes for reactivating certain catalysts which have undergone deactivation through deposition of contaminants, such as, iron, nickel, vanadium, etc. and of carbonaceous materials thereon and regeneration by oxidizing or burning-off of the inactivating carbonaceous deposits a number of times and which have suffered a serious loss in activity as shown by their high carbon and gas forming properties.

Processes for the catalytic conversion or cracking of liquid hydrocarbon are well known and widely practiced in the art. In these processes, liquid hydrocarbons such as gas oil, reduced crude, whole crude or the like are contacted while in vaporized form with active cracking catalysts at temperatures of from about 800 to 1100° F. for a period sufficient to give the desired conversion. Contact of hydrocarbon vapors and catalyst may be effected in fixed bed or moving beds, preferably by the fluid catalyst method or technique in which finely divided solid catalyst particles are carried into or through a reaction zone in a stream of hydrocarbon vapors. Catalysts which have been used for this purpose have included acid activated clays such as acid treated bentonite and synthetic composite gel type catalysts such as silica-alumina, silica-magnesia or silica-magnesia-alumina gel composites.

During the hydrocarbon conversion or cracking operations, coke or carbonaceous material as well as minor amounts of heavy metal contaminants are deposited on the catalyst or contact particles thereby reducing or destroying their catalytic activity. The contaminated or spent catalyst is regenerated by mixing it with air or other regenerating gas which burns off the contaminating carbonaceous deposits. Freed of these carbonaceous deposits, the catalyst particles are suitable for reuse in the hydrocarbon conversion.

It has been found that after the catalyst has been used for some time and has undergone a number of regenerations, it suffers some loss in activity and a very substantial drop in its selectivity as shown by the high production of carbon and fixed gases. The ratio of the carbon produced by a catalyst being tested to that produced by an uncontaminated catalyst (deactivated with steam or heat) of the same activity is termed the "carbon producing factor" (C. P. F.) of the catalyst. It ranges from 1.0 for fresh catalyst to 1.5–2.0 for equilibrium catalyst. The ratio of amount (cu. ft. per barrel of oil) of dry gas produced by the catalyst being tested to the amount of dry gas produced by uncontaminated catalyst of the same activity is termed the "gas producing factor" (G. P. F.). The C. P. F. and G. P. F., of a catalyst provide good yardsticks for measuring the selectivity of a given catalyst.

It has been proposed in U. S. Patent No. 2,154,527 to activate certain materials by subjecting them to the action of fluorine compounds. While such treatments serve to increase the activity of certain materials, they have no or little effect upon the selectivity. It has also been proposed in U. S. Patent No. 2,439,852 to revivify certain catalysts that have been used in the production of diolefins by the catalytic condensation of an aliphatic alcohol with an aliphatic aldehyde by treating the spent catalyst with a dilute solution of hydrofluoric acid and thereafter reimpregnating the acid treated catalyst with the catalytic metal compound. It has also been proposed as disclosed in U. S. Patents 2,430,724 and 2,430,735 to return a deactivated catalyst to a higher activity level by contacting a hydrocarbon vapor containing organic fluorides with the deactivated catalyst under conversion conditions of temperature and pressure.

It is the object of this invention to provide the art with a novel and effective method for reactivating hydrocarbon conversion catalysts that have suffered a loss in activity and selectivity.

It is a further object of this invention to reactivate hydrocarbon conversion catalysts without appreciably decreasing their content of catalytic metal oxides.

These and other objects will appear more clearly from the detailed description which follows.

It has now been found that hydrocarbon conversion catalysts which have suffered a loss in activity and/or selectivity after several cycles of alternate contamination by deposition of carbonaceous materials and regeneration by oxidation or burning of carbonaceous deposits may have their activity and selectivity restored by treating the regenerated catalyst particles with a solution of an ammonium fluoride. Treatment of the spent or contaminated catalyst with neutral or acid ammonium fluoride permits the reactivation of the catalyst without appreciably removing catalytic metal oxides such as alumina or magnesia from the catalyst. The term "used" catalyst employed hereinafter is intended to mean catalyst particles that have been utilized in hydrocarbon conversion or cracking operations and have been regenerated or substantially freed of carbonaceous deposits by oxidation or burning preparatory to reactivation by treatment with a solution of an ammonium fluoride in accordance with this invention.

Hydrocarbon conversion catalysts which may be reactivated by treatment with an ammonium fluoride are the synthetic composite gel catalysts comprising a major proportion of silica gel and minor proportions of alumina or magnesia or both alumina and magnesia. Catalysts of this type are well known and widely used in the oil industry for the conversion or cracking of hydrocarbon oils and accordingly a detailed description of their manufacture and/or composition is believed unnecessary. Suffice to say, they ordinarily contain from about 50 to 95% of silica and from 50 to about 5% of alumina and/or magnesia.

The treatment of the hydrocarbon conversion catalysts of impaired or lowered activity with ammonium fluoride solution in accordance with the present invention may be effected by either soaking the catalyst particles in a solution of ammonium fluoride or by agitating a slurry or suspension of catalyst particles in ammonium fluoride solution. The soaking or agitation periods may be for from about 1 to 24 hours although generally treatments of up to about 3 hours will suffice. In general the agitating method is preferred since it permits more intimate and uniform contact of the treating solution and catalyst particles.

The ammonium fluoride treating solution may vary in concentration from 0.2 to about 10% NH$_4$F, the optimum concentration being about 1 to 2%. The dosage of ammonium fluoride may vary between about 1 and 10% by weight of the air dry catalyst particles, about 2 to 3% by weight of ammonium fluoride based on the catalyst appearing to be about optimum. The treatment of the catalyst particles with an ammonium fluoride solution may be effected at temperatures within the range of from 32 to about 200° F., preferably within the range of about 125 to 170° F.

The following examples are illustrative of the present invention.

EXAMPLE I 900 g. of a used silica-alumina cracking catalyst designated as catalyst A and showing the properties as listed in the table hereinbelow was covered with 726 cc. of 3.7% NH$_4$F solution (prepared by mixing equal weights of 2.0% HF and 1.7% NH$_4$OH solutions), stirred initially and allowed to soak for 1 hour at room temperature (80° F.). This solution contained approximately 27 g. NH$_4$F, equivalent to about 3% dosage on the weight of catalyst treated. The treated catalyst was then thoroughly washed, dried at 275° F. and pelleted in a tablet machine. The 3/16" pills were heated at 900° F. preparatory for testing for activity. The untreated catalyst A and the catalyst treated as described were given a standard cracking test. The results are tabulated in the table hereinbelow.

EXAMPLE II 900 g. of a used silica-alumina cracking catalyst designated as catalyst B and showing properties as listed in the table hereinbelow was covered with 2000 cc. of a solution containing 9 g. HF and 7.65 g. NH$_3$, and heated, while agitating with a mechanical stirrer to 170° F. and maintained at that temperature for 3 hours. The treatment was carried on in a loosely covered container of KA$_2$ metal. The treating solution contained NH$_4$F in 0.83% concentration and 1.85% dosage. The treated catalyst, after cooling, was then thoroughly washed, dried, pelleted and heated as in Example I whereupon the catalyst was given the standard cracking test. The results obtained are tabulated in the table hereinbelow.

EXAMPLE III 900 g. of used silica-alumina cracking catalyst (catalyst B) was covered with 1350 cc. of a solution containing 13.5 g. HF and 11.5 g. NH$_3$ and heated, while agitating with a mechanical stirrer to 125° F. and maintained at that temperature for 3 hours. The treatment was carried on in a loosely covered KA$_2$ container. The treating solution contained NH$_4$F in 1.85% concentration and 2.8% dosage. The treated catalyst was washed, dried, pelleted, activated and tested under the same conditions as in Examples I and II.

EXAMPLE IV

Example III was repeated except for the fact that the treatment was effected at 170° F. instead of 125° F.

EXAMPLE V 900 g. of used cracking catalyst (catalyst B) was covered with 1350 cc. of a solution containing 27 g. HF and 23 g. NH$_3$ and agitated with a mechanical stirrer for 3 hours at room temperature (80° F.). The conditions of treatment and the tests applied were otherwise the same as in the preceding examples.

EXAMPLE VI

Example V was repeated but the time of treatment was continued for 24 hours.

The properties of the several catalysts before and after the treatments described are summarized in the table. It may be readily seen from this data that the treatment effects a marked reduction in the C. P. F. (carbon producing factor) and G. P. F. (gas producing factor) and with at most only a very small effect upon the alumina content of the catalyst.

EXAMPLE VII

Example V was repeated except for the fact that the temperature of treatment was 170° F. rather than room temperature.

separating the treated catalyst from the slurry, washing and drying the separated catalyst, and

TABLE

*Revivification of used cracking catalysts with ammonium fluoride solutions*

| Catalyst | Treatment | Treatment with NH₄F solutions | | | | | Activity tests [1] | | | | | | Catalyst analysis Al₂O₃, percent wt. |
|---|---|---|---|---|---|---|---|---|---|---|---|---|---|
| | | Conc., percent | Dosage, percent | Time hr. | Temp., °F. | Method | 850° F. | | | Steamed 24 hrs., 1050° F., 60 p. s. i. g.[2] | | | |
| | | | | | | | D+L% | C. P. F. | G. P. F. | D+L% | C. P. F. | G. P. F. | |
| A | Untreated | | | | | | 30.7 | 1.43 | 1.43 | 20.0 | 1.12 | 1.21 | 13.3 |
| A | Example I | 3.7 | 3.0 | 1 | 80 | Soaking | 31.5 | 1.15 | 1.26 | 20.0 | .94 | 1.17 | 13.3 |
| B | Untreated | | | | | | 26.0 | 1.71 | 2.00 | 19.2 | 1.58 | 1.91 | 12.8 |
| B | Example II | .83 | 1.85 | 3 | 170 | Agitated | 31.0 | 1.27 | 1.58 | 17.0 | 1.17 | 1.70 | 12.5 |
| B | Example III | 1.85 | 2.8 | 3 | 125 | ...do | 32.5 | 1.25 | 1.43 | 19.0 | 1.02 | 1.09 | 13.2 |
| B | Example IV | 1.85 | 2.8 | 3 | 170 | ...do | 33.0 | 1.26 | 1.35 | 17.0 | 1.23 | 1.53 | 12.6 |
| B | Example V | 3.7 | 5.6 | 3 | 80 | ...do | 29.5 | 1.48 | 1.56 | 17.5 | 1.41 | 1.58 | 12.5 |
| B | Example VI | 3.7 | 5.6 | 24 | 80 | ...do | 28.5 | 1.45 | 1.49 | 18.0 | 1.13 | 1.24 | 12.3 |
| B | Example VII | 3.7 | 5.6 | 3 | 170 | ...do | 31.0 | 1.39 | 1.61 | | | | 12.4 |

[1] Results of tests in 200 cc. unit feeding East Texas light gas oil at 0.6 v./v./hr. for 2 hours at 850°F. 2 cycle test, using 200 cc. of 3/16" pelleted catalyst.
[2] Steamed under conditions cited and then tested in usual procedure at 850° F.

The foregoing description contains a limited number of embodiments of the present invention. It will be understood that these specific embodiments are for illustrative purposes only and that variations are possible without departing from the scope of the following claim.

What is claimed is:

In a process for reactivating spent silica-alumina composite gel cracking catalyst previously exposed to temperatures above 800° F. during a hydrocarbon conversion and catalyst regeneration cycle, the improvement which comprises mixing the spent catalyst with an aqueous solution containing ammonium fluoride in a concentration between 1 and 2 weight percent and in a total amount equal to 2 to 3 weight percent based on the catalyst, agitating the resulting liquid slurry at about 125° F. for 1 to 3 hours, separating the treated catalyst from the slurry, washing and drying the separated catalyst, and steaming the dried catalyst for about 24 hours at a temperature of about 1050° F. and at a pressure of about 60 lbs. per square inch gage.

CHARLES N. KIMBERLIN, JR.
JULIUS P. BILISOLY.

REFERENCES CITED

The following references are of record in the file of this patent:

UNITED STATES PATENTS

| Number | Name | Date |
|---|---|---|
| 2,154,527 | Pier et al. | Apr. 18, 1939 |
| 2,194,186 | Pier et al. | Mar. 19, 1940 |
| 2,331,473 | Hyman | Oct. 12, 1943 |
| 2,336,165 | Connolly | Dec. 7, 1943 |
| 2,414,736 | Gray | Jan. 21, 1947 |
| 2,430,724 | Meadow | Nov. 11, 1947 |